UNITED STATES PATENT OFFICE.

KARL BORNEMANN, OF AIX-LA-CHAPELLE, GERMANY, ASSIGNOR TO CHEMISCHE FABRIK COSWIG-ANHALT, G. M. B. H., OF COSWIG-ANHALT, GERMANY.

PROCESS OF OBTAINING POROUS AND FAIRLY-PURE BARIUM OXID FROM BARIUM CARBONATE.

1,041,583.

No Drawing.

Specification of Letters Patent.  Patented Oct. 15, 1912.

Application filed July 31, 1912.  Serial No. 712,573.

*To all whom it may concern:*

Be it known that I, KARL BORNEMANN, a citizen of the Empire of Germany, and residing at Aix-la-Chapelle, Germany, have invented a certain new and useful Improved Process of Obtaining Porous and Fairly-Pure Barium Oxid from Barium Carbonate, of which the following is a specification.

My invention relates to a process of obtaining porous and fairly pure barium oxid from barium carbonate.

The manufacture of barium oxid which is simultaneously fairly pure, porous and readily convertible into baric peroxid, from barium carbonate is connected with considerable difficulty, because under the conditions which generally prevail the decomposition can be brought about only at temperatures at which the reaction mass tends to be largely converted into a highly sintered and, indeed, partially molten condition. Now I have found that these difficulties can be very largely obviated when the temperature of decomposition of mixtures of barium carbonate and suitable reducing agents, specially carbon, is diminished by causing these mixtures to react not at an ordinary pressure as heretofore, but at reduced pressures which can be readily obtained technically with simple auxiliary means. For example, whereas in my tests at atmospheric pressure the reaction took place fairly completely only at approx. 1100° C., it could be brought about completely at a pressure of 10-20 mm. mercury at 860° C., and at a pressure of 65-70 mm. mercury at 940°-970° C., to mention only two extreme examples. The oxid made at atmospheric pressure was highly sintered, indeed partially molten, whereas the tests of oxid obtained at the reduced pressure had the form of a very fine powder only loosely caked together. Simultaneous tests for converting the oxid obtained into baric peroxid yielded, for example, in the case of the oxid produced at a pressure of 65-70 mm. mercury, a peroxid containing 87% barium dioxid ($BaO_2$), in spite of the tests being carried out in a very primitive manner without stirring or other movement of the oxid, whereas the oxid which was otherwise treated exactly similarly but produced at atmospheric pressure yielded a peroxid containing on an average only 47% barium dioxid ($BaO_2$). I may add that even materially less diminution of pressure than that employed in the mentioned examples distinctly shows the effect; the greater the reduction of the pressure, the more favorable, it is true, is the action. But as, on the other hand, a great diminution of pressure is, in general, connected with greater expense, the pressures to be maintained will vary according to the practical conditions met with in each case. A limit is set only by the pressure having under all circumstances to be materially less than 1 atmosphere.

When technically carrying into practice the process resulting from these observations I proceed, for example, as follows:— One or more vessels of flat, muffle-shaped, cylindrical or other suitable form of fireproof material which not only reacts as little as possible with barium oxid and is used for containing the reduction mass but can also be electrically heated by a resistance, *e. g.*, spirals of iron, nickel or carbon, wound outside it, is or are built into a larger vessel or container of strong sheet-iron, *e. g.*, boiler plates riveted air-tight together, or other material impervious to air and sufficiently able to withstand the pressure of the outer atmosphere. This larger vessel or container, whose walls may be covered within, if desired, with a refractory insulation to avoid losses of heat, is so arranged that all its apertures, such as for doors, holes for electric conductors to the resistances, and the like, can be closed air-tight, so that the entire container can be evacuated by means of an air-pump to a very low pressure. After this furnace has been charged with the reaction mass, *e. g.*, barium carbonate and charcoal, it is evacuated to the desired pressure materially below atmospheric, and the reaction chamber is heated by means of the electric current to a temperature at which the reaction becomes vigorous and continues to the end, the reaction gases being, of course, constantly drawn off in order to maintain the low pressure. The barium oxid which is formed can then be drawn off while hot and the still hot furnace can be charged afresh, and so on.

As the process is connected with considerable generation of gas, the course or end of the reaction is shown by the degree of this generation of gas or by its termination. The development of gas is indicated at the manometer connected to the furnace owing to the pressure rising a few millimeters, but of course it may be measured in any other desired manner.

I claim:—

1. A process of producing very porous, fairly pure barium oxid from barium carbonate, consisting in heating a mixture of barium carbonate and a reducing agent to the reaction temperature at a pressure below atmospheric.

2. A process of producing very porous, fairly pure barium oxid from barium carbonate, consisting in heating a mixture of barium carbonate and a reducing agent in a partial vacuum to the reaction temperature of the mixture, and in constantly drawing off the gases which are produced.

In testimony whereof, I affix my signature in the presence of two witnesses.

KARL BORNEMANN.

Witnesses:
 HENRY CUNAPING,
 ELISE KALBUSCH.